(12) United States Patent
Miller (10) Patent No.: US 12,114,643 B2
(45) Date of Patent: Oct. 15, 2024

(54) ANIMAL HARNESS AND COMPATIBLE ANIMAL CLOTHING

(71) Applicant: 8372683 Canada Inc., Lachine (CA)

(72) Inventor: Lorne Miller, Montréal (CA)

( * ) Notice: Subject to any disclaimer, the term of this patent is extended or adjusted under 35 U.S.C. 154(b) by 0 days.

(21) Appl. No.: 18/053,950

(22) Filed: Nov. 9, 2022

(65) Prior Publication Data

US 2024/0147965 A1    May 9, 2024

(51) Int. Cl.
*A01K 27/00* (2006.01)
(52) U.S. Cl.
CPC .................................. *A01K 27/002* (2013.01)
(58) Field of Classification Search
CPC ... A01K 27/002; A01K 13/006; A01K 13/008
See application file for complete search history.

(56) References Cited

U.S. PATENT DOCUMENTS

| 1,595,834 | A * | 8/1926 | Griffiths | A01K 13/006 |
| | | | | 119/855 |
| 6,827,044 | B2 * | 12/2004 | Lobanoff | A01K 27/002 |
| | | | | 119/856 |
| 8,210,131 | B2 * | 7/2012 | Friedland | A01K 13/006 |
| | | | | 119/792 |
| 9,204,621 | B1 * | 12/2015 | Miller | A01K 27/002 |
| 9,332,734 | B1 * | 5/2016 | Hege | A01K 13/006 |
| 9,795,117 | B1 * | 10/2017 | Grant | A01K 13/007 |
| 2006/0090711 | A1 * | 5/2006 | Richards | A01K 1/0263 |
| | | | | 119/850 |
| 2008/0223310 | A1 * | 9/2008 | Remick | A01K 27/002 |
| | | | | 119/792 |
| 2012/0024239 | A1 * | 2/2012 | Forbes | A01K 27/002 |
| | | | | 119/863 |
| 2018/0116175 | A1 * | 5/2018 | Lui | A01K 27/001 |

OTHER PUBLICATIONS

International application No. PCT/CA2023/050891 International Search Report dated Sep. 12, 2023.
International application No. PCT/CA2023/050891 Written Opinion of the International Searching Authority dated Sep. 12, 2023.

* cited by examiner

*Primary Examiner* — Kristen C Hayes
(74) *Attorney, Agent, or Firm* — Anglehart et al.

(57) ABSTRACT

An animal harness and compatible animal clothing are disclosed. The harness has a special construction which allows a part of it to be separated and connected to animal clothing with compatible fasteners. The fasteners which connect the harness to the clothing are fastened to inner layers of the clothing, effectively providing the aesthetic benefits of clothing with the functional benefits of a harness. There are straps of strong material integrated with the animal clothing, so that connection of the part of the animal harness to the animal clothing forms an integrated harness within the animal clothing.

18 Claims, 12 Drawing Sheets

ANIMAL HARNESS AND COMPATIBLE ANIMAL CLOTHING

TECHNICAL FIELD

This patent application relates to systems and methods for animal clothing and harnesses.

BACKGROUND

Animal owners may wish to dress their animals. Some owners dress their animals for the purposes of protecting the animal from the elements, such as an insulated coat for warmth, raincoat to stay dry, or dog boots to protect from salt, stones and snow during winter. Other owners dress their animals for the purposes of style and social standing, such as by having their animal dress in a matching outfit to the owner.

Animal owners may need to harness their animals. Whether this is required by law, or merely a choice of the owner, most animal owners will need some form of harness to restrict their animal's movement, for the protection of the animal or others. Harnesses may come in various shapes, but the harness must sufficiently attach to the animal to allow for the owner to move or stop the animal by pulling on the harness. Harnesses are usually fabricated for durability due to the harness' function which requires it to hold together the opposing forces of an owner pulling the animal and the animal trying to move away from the owner.

It is difficult to combine the animal clothing and animal harnesses. Firstly, animal clothing may undermine the function of the harness, as the clothing may cover the part of the animal that is usually attached to the harness, making it easier for the animal to escape the harness, making it more difficult to attach the harness, or at least reducing the overall effectiveness of the harness. Secondly, harnesses may damage animal clothing due to the often strong and rough materials used for harnesses being pulled back and forth over the clothing through use. In the case of a coat for warmth, the harness can compress insulation and reduce the warmth of the coat. Thirdly, harnesses are often bulky and unsightly, which could negatively affect an aesthetic that certain owners may wish to have when dressing their dogs in clothing.

SUMMARY OF THE INVENTION

The present disclosure relates to systems and methods for animal clothing and animal harnesses. Herein is described an animal harness and an animal coat that can be combined to form animal clothing with integrated harnesses. The coat is outfitted with fasteners that can connect to the harness. The fasteners themselves are connected to harness-like structures that are integrated within the coat, sometimes under the outer layers of fabric. This overcomes the problems in the prior art of harnesses destroying the outer layers of clothing, of harnesses negatively affecting the appearance of the animal, and of clothing reducing the effectiveness of the harness.

A broad aspect of the current disclosure is, in combination, a coat for animals and a harness for animals where said animal harness includes an upper portion, itself including upper straps, a pair of upper front fasteners connected to said upper straps, a pair of upper rear fasteners connected to said upper straps, a leash connecting loop connected to said upper straps and wherein said upper straps are adjustable so that the animal harness can fit snugly on a given animal and a lower portion, itself including lower strap, a pair of lower front fasteners connected to said lower straps that are complementary to the pair of front fasteners on the upper portion and a pair of lower rear fasteners connected to said lower straps that are complementary to the pair of rear fasteners on the upper portion, and where said animal coat includes a body portion for covering at least part of a torso of the animal, front and rear straps connected to and integrated within the body portion, two or more apertures allowing the coat to be pulled up onto the body over at least two of the animal's legs, a pair of coat front fasteners connected to the front straps, one on the right side of the body portion and one on the left side of the body portion, both positioned to be anterior to the animal's front legs, that are located on said body portion to correspond to locations of the lower front fasteners on said lower portion of said animal harness and complementary to one pair of front fasteners on the harness and a pair of coat rear fasteners connected to the rear straps, one on the right side of the body portion and one on the left side of the body portion, both positioned to be posterior to the animal's front legs, that are located on said body portion to correspond to locations of the lower rear fasteners on said lower portion of said animal harness and complementary to one pair of rear fasteners on the harness, wherein the upper portion of the harness can connect to the bottom portion of the harness to form the animal harness, wherein the upper portion of the harness can connect to the animal coat by the upper front fasteners connecting to the coat front fasteners and the upper rear fasteners connecting to the coat rear fasteners to form a harness integrated within the animal coat and wherein, when connected to said lower portion of the harness or to said animal coat, the upper portion of the harness can be adjusted to fit a particular animal, created an adjusted upper portion, and said adjusted upper portion can retain its fit between multiple connections to said lower portion of the harness or said animal coat.

In some embodiments, the combination further includes one or more indicators on or connected to the upper, lower, front or rear straps of the animal harness or animal coat, displaying information about the type of harness or coat or identifying one or more fasteners, for facilitating assembly or use of the harness or animal coat with harness.

In some embodiments, the front and rear straps of the animal coat run along the inside of the body portion so as not to crush or rub against the outside of the body portion and connect to front coat fasteners and rear coat fasteners, respectively, on the outside of the body portion via small holes in the body portion.

In some embodiments, the combination further includes one or more pieces of the material forming the coat that are placed or sewn over the front and rear straps or front coat fasteners or rear coat fasteners of the animal coat to hide them from sight.

In some embodiments, the combination further includes pocket areas in the animal coat allowing the front coat fasteners or rear coat fasteners of the animal coat to be hidden within the coat when not connected to an upper portion of a harness, or for hiding the front coat fasteners or rear coat fasteners when connected to an upper portion of a harness such that only the harness straps and leash connecting loop are visible.

Another broad aspect of the current disclosure is a coat for animals including a body portion for covering at least part of the torso of the animal, front and rear straps connected to and integrated within the body portion, a pair of front coat fasteners, one on the right side of the body portion and one on the left side of the body portion, connected to the front straps, a pair of rear coat fasteners, one on the right side of the body portion and one on the left side of the body portion, connected to the rear straps and two or more apertures allowing the coat to be pulled up onto the body over at least two of the animal's legs, wherein the front coat fasteners are anterior to the front legs of the animal, and the rear coat fasteners are posterior to the front legs of the animal, wherein a front strap of strap connects to both front coat fasteners in addition to connecting to the body portion, such that the front strap of strap runs along the ventral or dorsal side of the animal, and a rear strap of strap connects to both rear coat fasteners in addition to connecting to the body portion, such that the rear strap of strap runs along the ventral or dorsal side of the animal and whereby the front coat fasteners and rear coat fasteners of the coat for animals can be connected to a portion of a compatible harness with adjustable straps to form an adjustable harness integrated within the coat for animals.

In some embodiments, the front and rear straps run along the inside of the body portion so as not to crush or rub against the outside of the body portion and connect to the front coat fasteners and rear coat fasteners, respectively, on the outside of the body portion via small holes in the body portion.

In some embodiments, the animal coat further includes one or more pieces of the material forming the coat that are placed or sewn over the front or rear straps to hide them from sight.

In some embodiments, the animal coat further includes at least one legging connected to the body portion, for covering at least part of at least one leg of the animal.

In some embodiments, the animal coat further includes an attachment section on the inside of the body portion, toward the posterior side of the body portion, for connecting to a rear section of fabric to cover the lower back and at least part of the back legs of the animal.

Another broad aspect of the current disclosure is a harness for animals, the harness including a left leash connecting loop, a left strap connected to said left leash connecting loop, a left interconnecting node connected to said left leash connecting loop, a left front strap connected to said left interconnecting node, a left rear strap connected to said left interconnecting node, a middle front interconnecting node connected to said left front strap, a middle rear interconnecting node connected to said left rear strap, a middle strap connected to said middle front interconnecting node and to said middle rear interconnecting node, a right front strap connected to said middle front interconnecting node, a right rear strap connected to said middle rear interconnecting node, a right interconnecting node connected to said right front strap and to said right rear strap, a right strap connected to said right interconnecting node and a right leash connecting loop connected to said right strap, wherein a left aperture is formed by the left front strap, left rear strap and middle strap and a right aperture is formed by the right front strap, right rear strap and middle strap, wherein the interconnecting nodes give a degree of movement to the straps attached to them, allowing the harness to adapt to the shape of the animal and whereby the harness can be outfitted on an animal by placing the animal's feet in the right and left apertures, pulling the harness up the legs of the animal and attaching the left leash connecting loop and right leash connecting loop to a leash behind the back of the animal.

In some embodiments, the harness further includes a connecting clip connected to the left leash connecting loop and a clip connecting loop connected to the right leash connecting loop, for facilitating assembly of the harness because a user can clip the clip connecting loop into the connecting clip and immobilize the harness on the animal before connecting it to a leash and for providing additional stability to the harness.

In some embodiments, the harness further includes a strap length adjusting mechanism present on each of the front left strap, rear left strap, front right strap and rear right strap for created an adjustment fitting the shape of a particular animal and retaining the adjustment between uses of the harness until the harness is readjusted.

In some embodiments, the harness further includes four pairs of complementary fasteners, such that the front left strap is segmented into two sections, the section closest to the left interconnecting node and containing the strap length adjusting mechanism is connected to an upper front fastener and the section closest to the middle front interconnecting node is connected to a lower front fastener, and the upper front fastener and lower front fastener form a complementary pair of fasteners that can be connected, the rear left strap is segmented into two sections, the section closest to the left interconnecting node and containing the strap length adjusting mechanism is connected to an upper rear fastener and the section closest to the middle rear interconnecting node is connected to a lower rear fastener, and the upper rear fastener and lower rear fastener form a complementary pair of fasteners that can be connected the front right strap is segmented into two sections, the section closest to the right interconnecting node and containing the strap length adjusting mechanism is connected to an upper front fastener and the section closest to the middle front interconnecting node is connected to a lower front fastener, and the upper front fastener and lower front fastener form a complementary pair of fasteners that can be connected and the rear right strap is segmented into two sections, the section closest to the right interconnecting node and containing the strap length adjusting mechanism is connected to an upper rear fastener and the section closest to the middle rear interconnecting node is connected to a lower rear fastener, and the upper rear fastener and lower rear fastener form a complementary pair of fasteners that can be connected, wherein the portion of the harness delimited by the two lower front fasteners and two lower rear fasteners is a lower portion of the harness, and the portion of the harness that is delimited by the two upper front fasteners and two upper rear fasteners is an upper portion of the harness and whereby the upper portion of the harness can be connected to the lower portion of the harness to form an animal harness or can also be connected to a complementary animal clothing to form a harness integrated within the animal clothing.

In some embodiments, at least one of the front left strap, rear left strap, front right strap and rear right strap are painted with, threaded with or otherwise support light-reflecting material that will impart to both portions of the harness increased visibility.

BRIEF DESCRIPTION OF THE DRAWINGS

The system of the present disclosure will be better understood by way of the following detailed description of embodiments of the invention with reference to the appended drawings, in which.

DETAILED DESCRIPTION

The present disclosure relates to systems and methods for animal clothing and animal harnesses and will be better understood by reference to the following figures. It should be understood that various combinations or modifications of the following descriptions may not be explicitly referred to but are understood by one skilled in the art to be encompassed in this disclosure.

Figure 1:
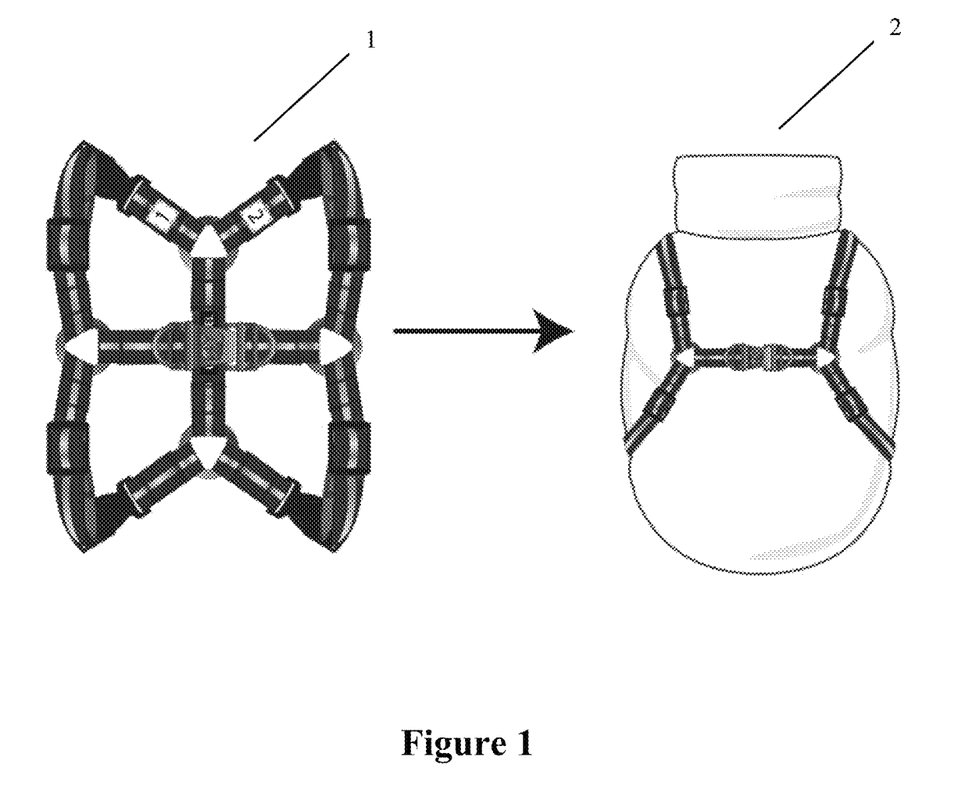
FIG. 1 is a representation of an animal harness.

FIG. 1 is a representation of an animal harness. The harness 1 is meant to connect to itself using fasteners such that it wraps around the body shape of an animal 2. The harness 1 is described in detail through FIGS. 2-11.

Figure 2:
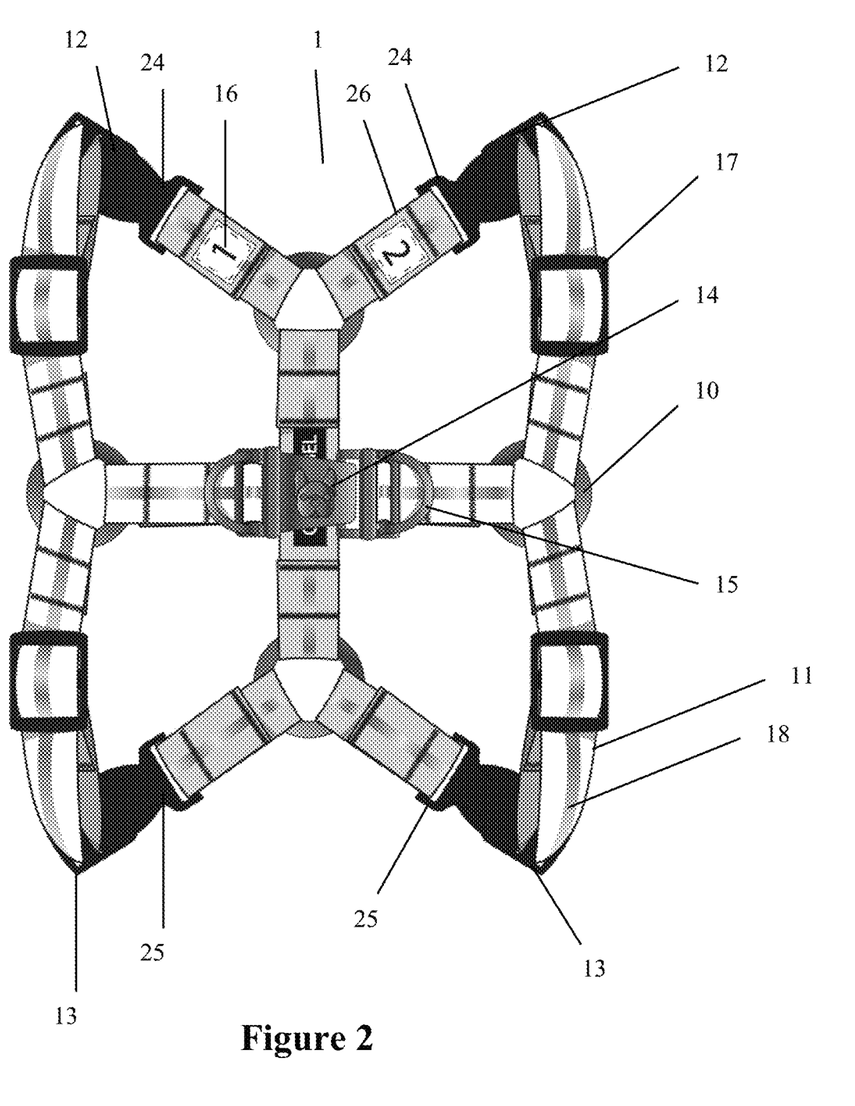
FIG. 2 is a dorsal view of the harness.
Figure 6:
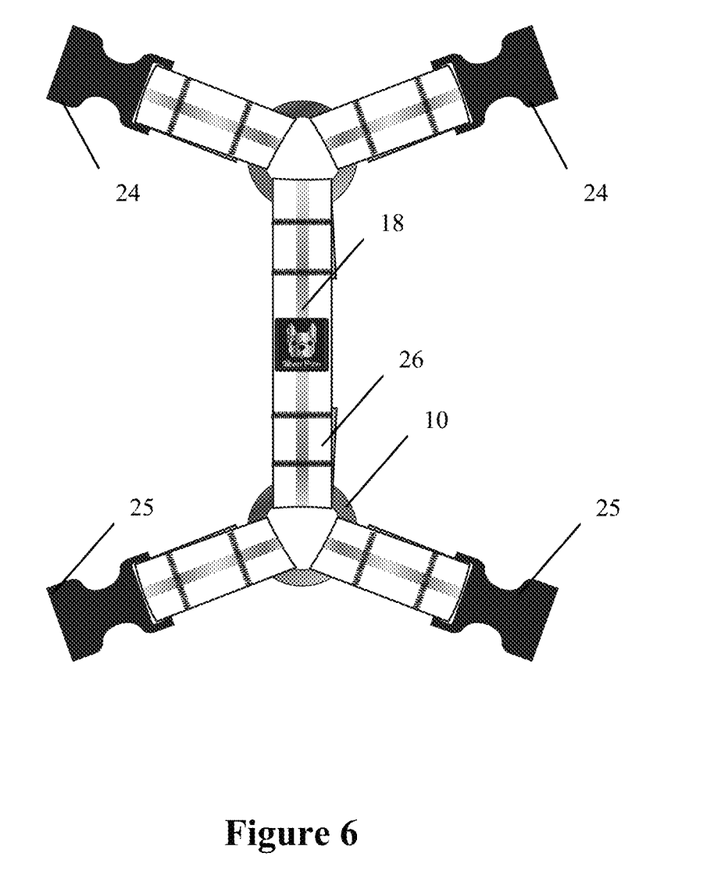
FIGS. 6 and 7 are front and back representations of a lower portion of the harness with fasteners.
Figure 7:
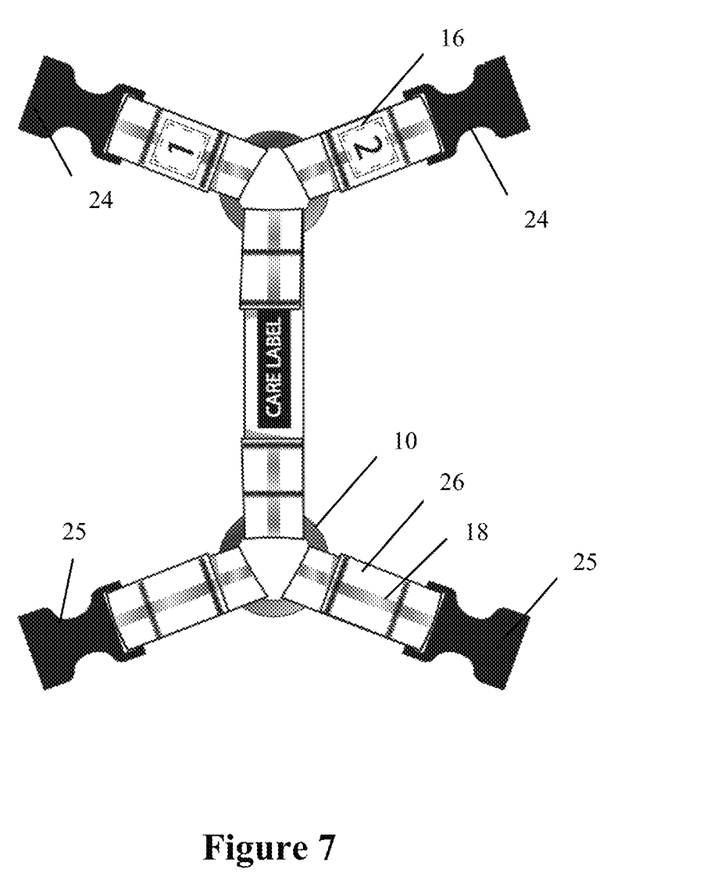
Figure 8:
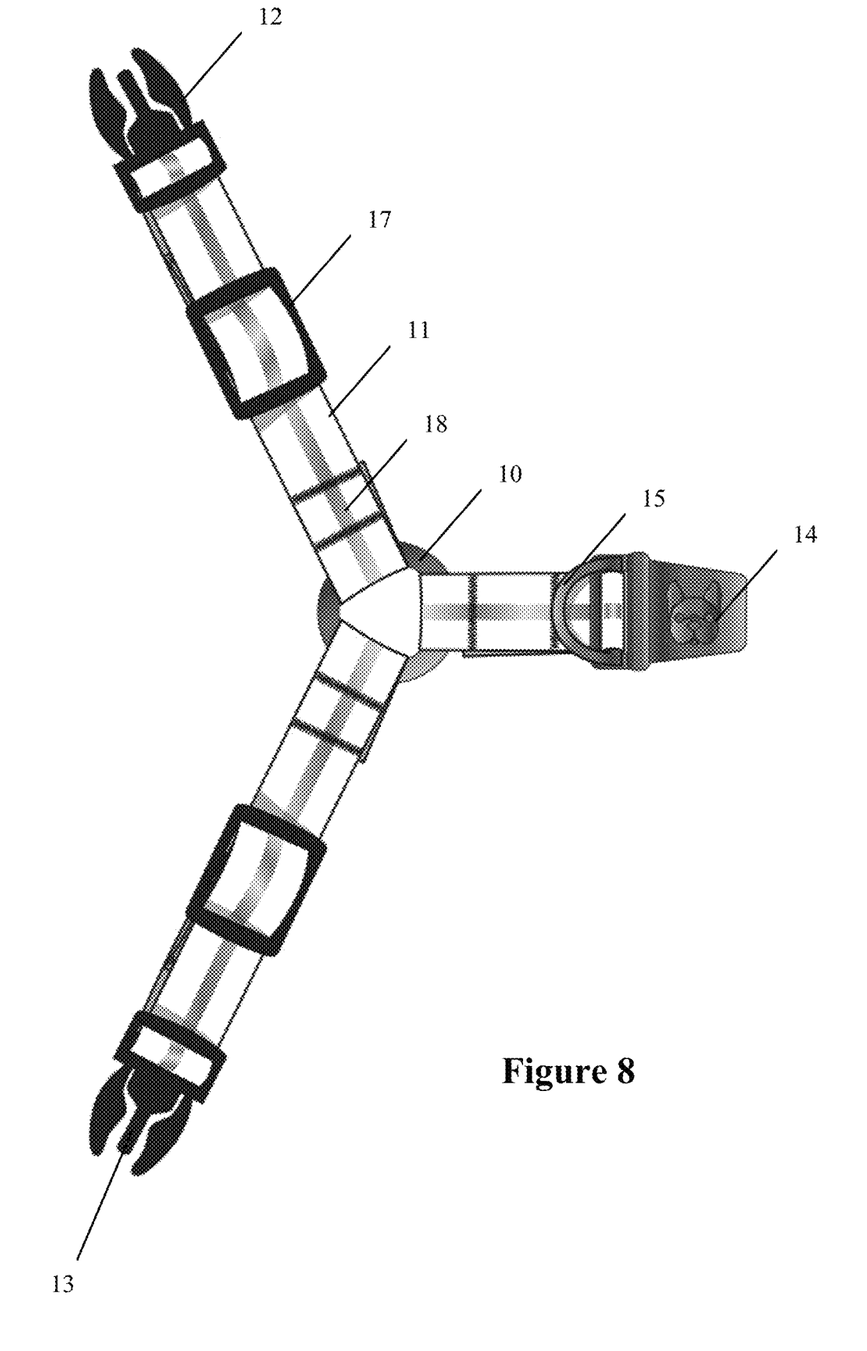
FIGS. 8 and 9 are front and back representations of a first sub-portion of the upper portion of the harness with fasteners and the clip of a connecting clip.
Figure 9:
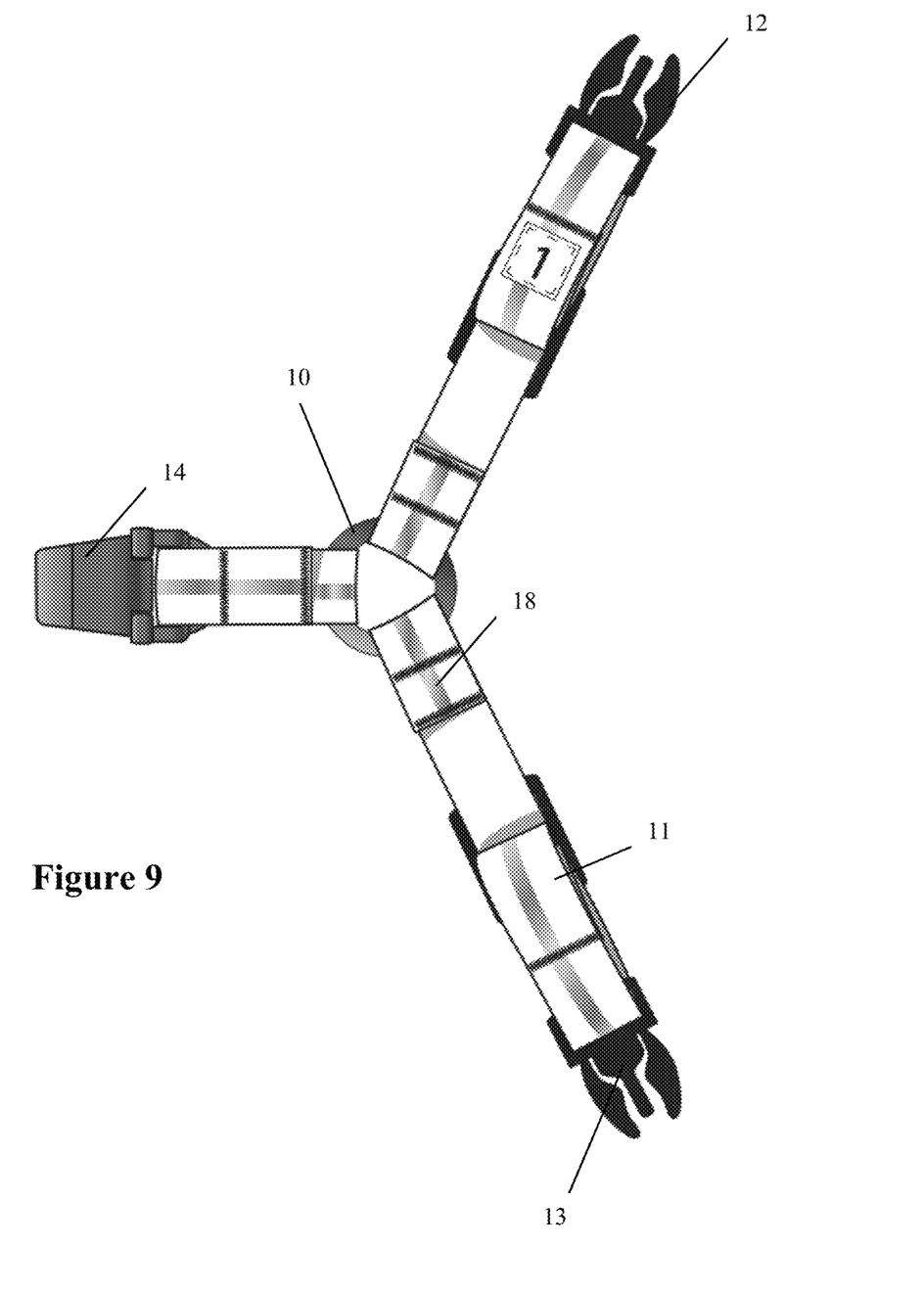
Figure 10:
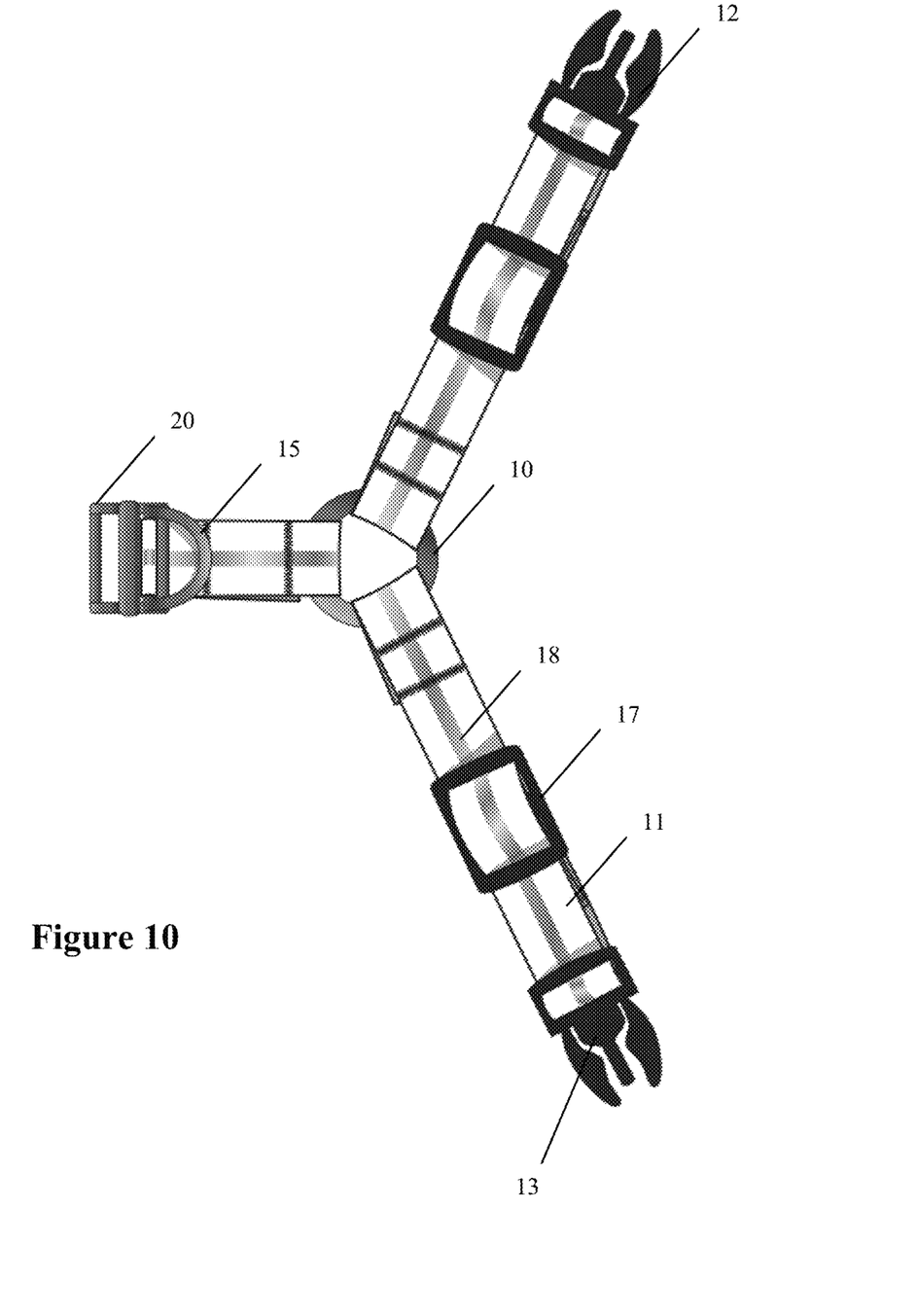
FIGS. 10 and 11 are front and back representations of a second sub-portion of the upper portion of the harness with fasteners and an clip connecting loop.
Figure 11:
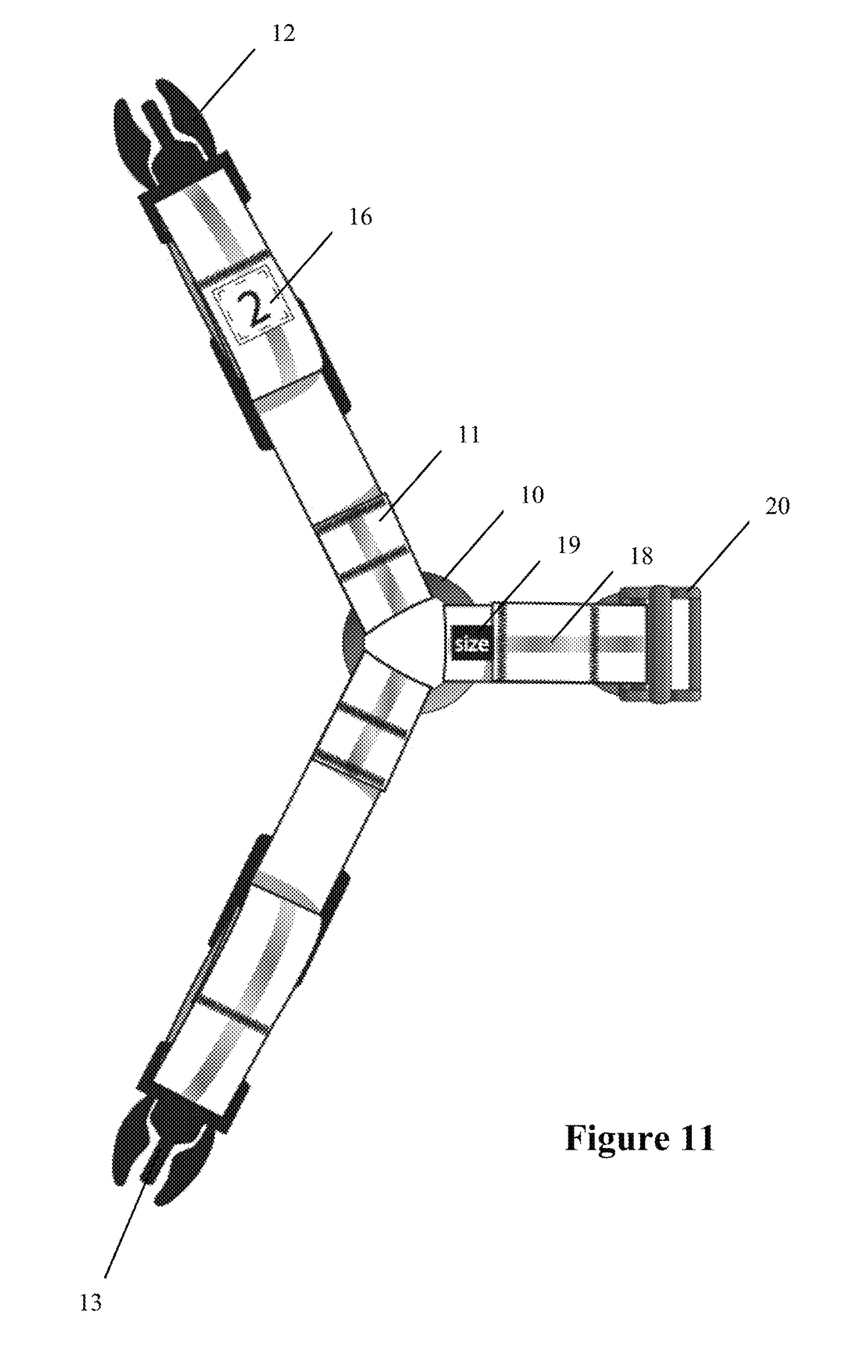
Figure 12:
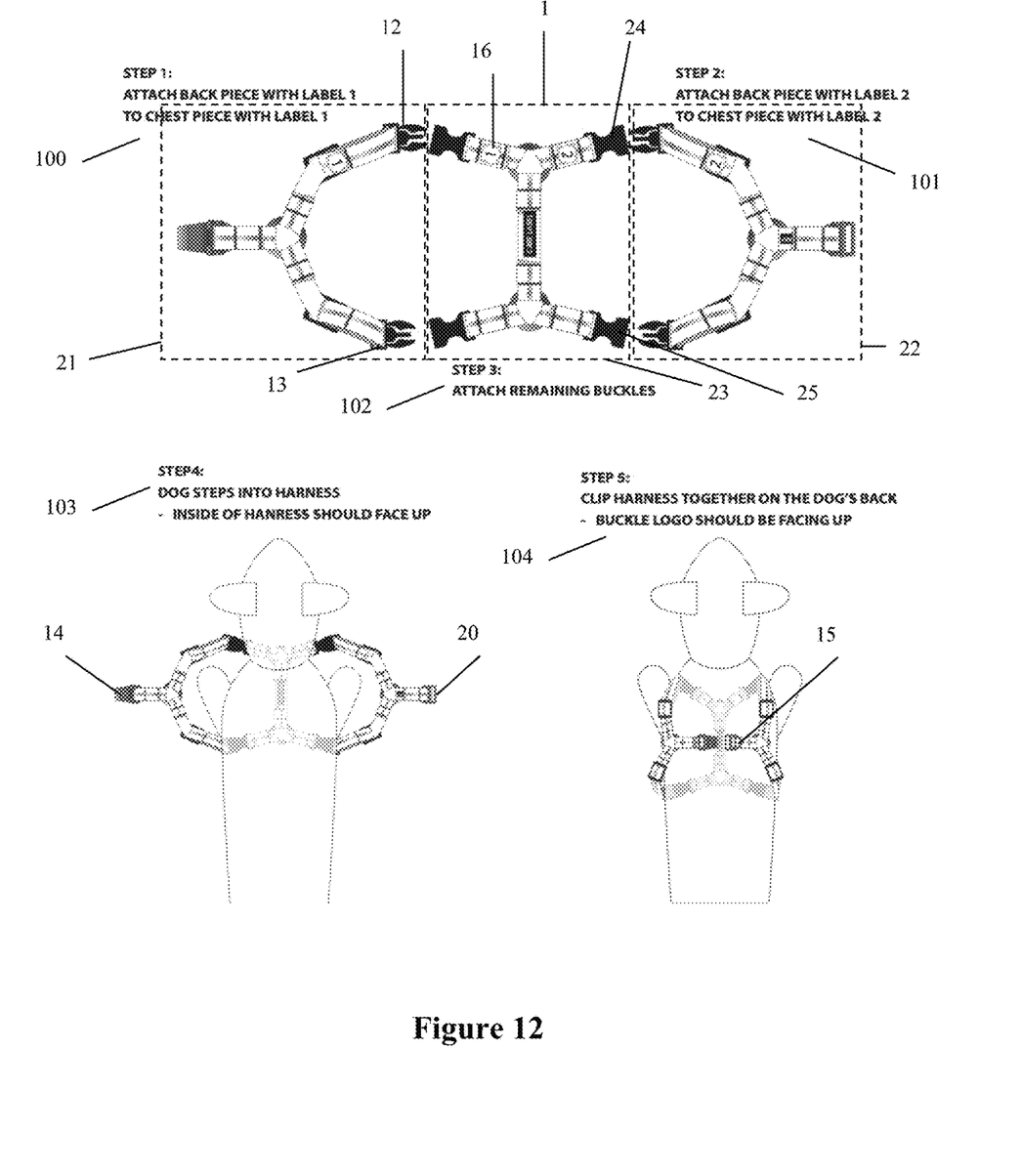
FIG. 12 is a visual guide for attaching a harness to an animal.

FIG. 2 is a dorsal view of the harness. In a preferred embodiment, the harness is formed by two main portions: the upper portion (which is divided into a first sub-portion and second sub-portion) and the lower portion. These portions may be clearly seen in the dashed boxes of FIG. 12, showing the first sub-portion of the upper portion 21, second sub-portion of the upper portion 22 and lower portion 23. The lower portion, which is represented in FIGS. 6 and 7, may be formed by two interconnecting nodes 10, lower straps 26, two lower front fasteners 24 and two lower rear fasteners 25. The first sub-portion of the upper portion, which is represented in FIGS. 8 and 9, may be formed by a connecting clip 14, a leash connecting loops 15, an interconnecting node 10, upper straps 11, an upper front fastener 12 and upper rear fasteners 13. The second sub-portion of the upper portion, which is represented in FIGS. 10 and 11, may be formed by a clip connecting loop 20, a leash connecting loops 15, an interconnecting node 10, upper straps 11, an upper front fastener 12 and an upper rear fastener 13. The two sub-portions of the upper portion may connect to each other via the connecting clip 14 and the clip connecting loop 20 (see FIG. 12). The upper portions of the harness may connect to the lower portion of the harness, forming a harness (see FIG. 12). The upper portion of the harness may also connect independently to compatible animal clothing 30, forming a harness integrated with the clothing (see FIG. 13, an example of an upper portion of a harness connecting to compatible animal clothing 30).

Figure 4:
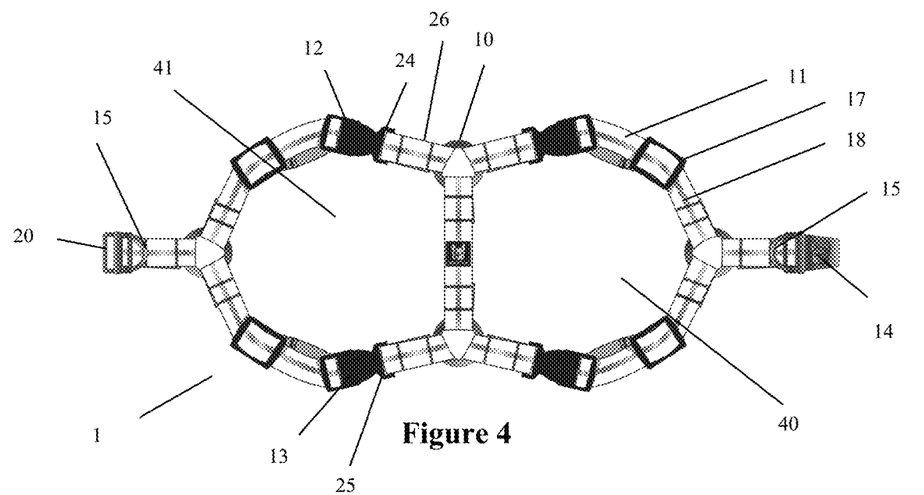
FIG. 4 is a ventral view of the harness where the connecting clip has been unclipped.
Figure 5:
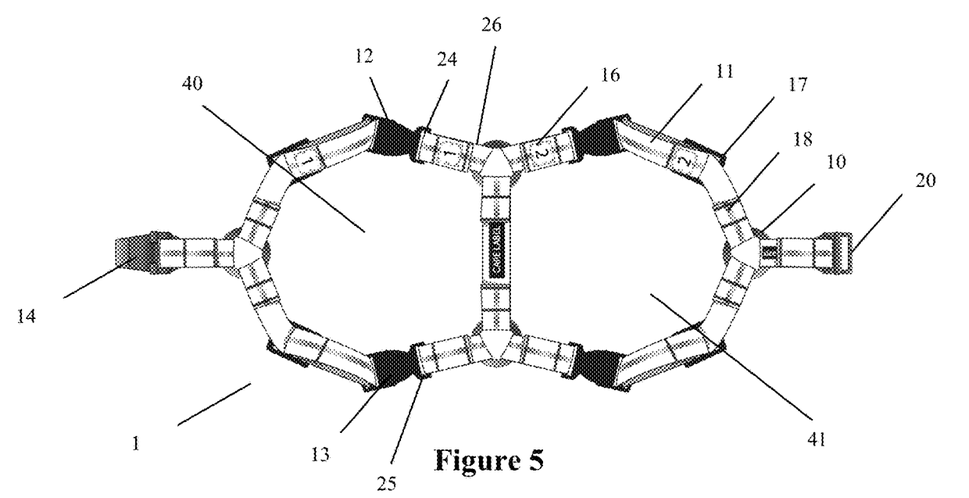
FIG. 5 is a dorsal view of the harness where the connecting clip has been unclipped.

The straps and interconnecting nodes form two apertures through which an animal's legs can be placed (see FIGS. 4-5). In a preferred embodiment, an animal's left leg would be situated in left aperture 40 and an animal's right leg would be situated in right aperture 41.

In a preferred embodiment, the interconnecting nodes 10 are metal rings. The upper and lower straps may be looped around the interconnecting nodes 10, securing the connection but allowing the straps to move along or around the interconnecting node 10 to better fit the shape of the animal. In a preferred embodiment, the upper front fastener 12 upper rear fastener 13 would be of a side-release buckle type. The upper front fastener 12 and upper rear fastener 13 of the upper portion of the harness would thus be able to clip into the lower front fastener 24 and lower rear fastener 25, respectively, of the lower portion of the harness to form a stable and strong connection, which can be released at the convenience of the user by pressing on the sides of the buckle. In a preferred embodiment, the connecting clip 14 is formed by a type of snap buckle, preferably a wide push gate snap hook, which can snap around a clip connecting loop 20, preferably a square-shaped metal ring, to create a stable connection and secure the harness 1 to the animal. The connecting clip 14 and clip connecting loop 20 may also each be connected to a leash connecting loops 15, preferably metal D-shaped rings, to connect to any snap clasp that are common on animal leashes and allow the animal owner to pull on the harness 1 via a leash.

In some embodiments, it may be possible for the harness to not have the connecting clip 14 and clip connecting loop 20 in order to function as a harness. The leash would bring the leash connecting loops 15 together, effectively closing the harness over the back of the animal. However, the connecting clip 14 brings certain advantages, and is thus part of the preferred embodiment. The connecting clip 14, when connected to the clip connecting loop 20, provides additional stability and durability to the harness, allowing for better distribution of pulling force from the leash, and may be useful merely for stabilizing the harness around the back of the animal when a leash isn't connected.

In some embodiments, the kinds of fasteners, clips or interfaces may change. The description above and the Figures show a preferred embodiment, however, other clips, fasteners or interfaces that accomplish similar functions (stable, strong, releasable connection) may be used. Additionally, for the various components (straps, interconnecting nodes 10, etc.), a variety of materials may be used.

Leash connectors, such as leash connecting loops, which are merely metal D rings, are meant to denote structures that can connect to conventional leashes that have snap hook clasps and can withstand the pulling force between the animal and owner and transfer that force to the structure of the harness or integrated harness within animal clothing. In some embodiments, the leash connecting loops may be replaced by other appropriate leash connectors.

In some embodiments, the harness 1 may include more, less or different portions, sub-portions, fasteners or connecting loops. Various constructions may be useful for different animal shapes, or different degrees of harnessing an animal's movement. For example, although the harness 1 of FIG. 2 is meant to wrap around the body and front legs of an animal (see FIGS. 12-13 for illustration), it would be natural to add additional interconnecting nodes 10 and strap 11 to also wrap around the hind legs of an animal. It should thus be understood that this disclosure teaches the natural combinations or modifications to the design to fit other such shapes or functions.

In some embodiments, the harness 1 may include excess upper strap 11 material and a slide or ladder lock buckle 17 for adjusting the length of strap of upper straps 11, thus allowing the user greater customization of the product to fit their and their animal's needs and comfort. The adjustment of the length of upper straps 11 straps may be done via other mechanisms, such as by snap clasps or holes and an immobilizing prong (similar to a belt holes and prong). This adjustment, as is described in more detail below, can be extremely useful for an owner with multiple animals or seeking to keep the right adjustment 'fit' of a particular animal between many lower portions of harnesses or animal coats.

In some embodiments, the harness 1 may include markings, fluorescent material or other forms of indicators to increase the visibility of the harness. In a preferred embodiment, the upper straps 11 and lower strap 26 of the harness 1 are laced with, threaded with or glued to reflective material 18 and provide increased visibility to the harness. This could be useful at night, for example, where a car's headlights may reflect highly off the reflective material 18 and cause the driver to see the animal wearing the harness and prevent a potential accident.

In some embodiments, the interconnecting nodes 10 may have different shapes, such as being triangular instead of round.

In some embodiments, there may be numbers 16 sewn in to the upper straps 11 or lower straps 26 to allow for more convenient or informative assembly by the user. For example, sowing the number 1 near an upper front fastener 12 and another number 1 near its complimentary lower front fastener 24 would allow the user to more quickly assemble the harness.

In some embodiments, other tags 19 may be sewn into the upper straps 11 or lower straps 26 to indicate information such as size of the harness, material of the harness, etc.

Figure 3:
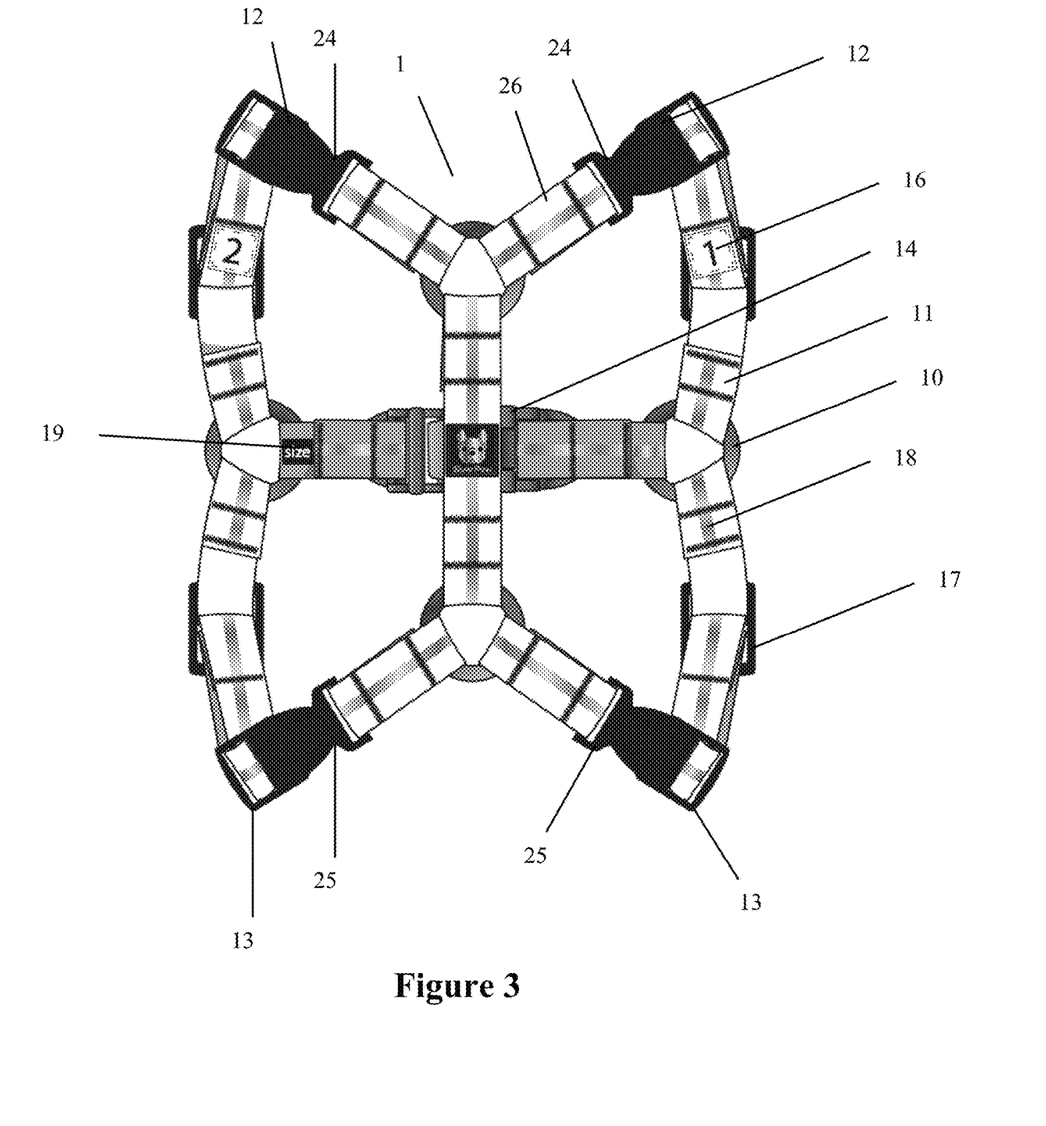
FIG. 3 is a ventral view of the harness.

FIGS. 3-11 merely show different views of the harness 1 described above. FIG. 3 is a ventral view of the harness. FIG. 4 is a ventral view of the harness where the connecting clip connector has been unclipped. FIG. 5 is a dorsal view of the harness where the connecting clip connector has been unclipped. FIGS. 6 and 7 are front and back representations of the lower portion of the harness. FIGS. 8 and 9 are front and back representations of a first sub-portion of the upper portion of the harness. FIGS. 10 and 11 are front and back representations of second sub-portion of the upper portion of the harness.

FIG. 12 is a visual guide for attaching a harness to an animal. In step 100, the upper front fastener 12 of the first sub-portion 21 is connected to the complementary lower front fastener 24 on the lower portion 23. This may be guided with the use of numbers that indicate which fasteners are complementary. In step 101, an upper front fastener 12 of the second sub-portion 22 is connected to its complementary lower front fastener 24 on the lower portion 23. This may be guided with the use of numbers that indicate which fasteners are complementary. In step 102, the remainder of the upper rear fasteners 13 of the first and second sub-portions are connected to their complementary lower rear fasteners 25 on the lower portion 23. In step 103, the harness 1 is pulled up over the front legs of an animal. In step 104, the harness 1 is wrapped around the back of the animal and the connecting clip 14 of the first sub-portion 21 is connected to the clip connecting loop 20 of the second sub-portion 22 to secure the harness. Although not shown, a leash could be connected to the leash connecting loops 15 of the harness 1 in a further step.

It may also be possible to dress the harness on the animal in different ways. The specific construction of the harness of this disclosure allows a user the flexibility to decide how they wish to dress their animal. For example, a user may connect the upper and lower portion of the harness together, unclip the connecting clip and leave the harness on the floor. The user may then place the animal's feet in the apertures of the harness. The user may then pull the harness up the legs of the animal and merely connect the connecting clip to the clip connecting loop behind the animal's back. Such a method for dressing the animal may be extremely convenient in requiring fewer connections to be made. Alternatively, a user may also dress the animal by connecting the upper and lower portion of the harness by the front fasteners, place it on the animal, and then just connect the rear fasteners behind the animal's legs. This provides convenience in not needing to place an animal's legs in the apertures, while still needing to connect a minimal amount of fasteners. The key, though, is the flexibility of the harness in allowing the owner to assemble the harness in the method they wish. This flexibility may also apply to the compatible animal clothing discussed below, for example, by allowing the owner to have some or all of the fasteners of the upper portion of the harness connected to the animal as the animal is being dressed in the coat.

Figure 13:
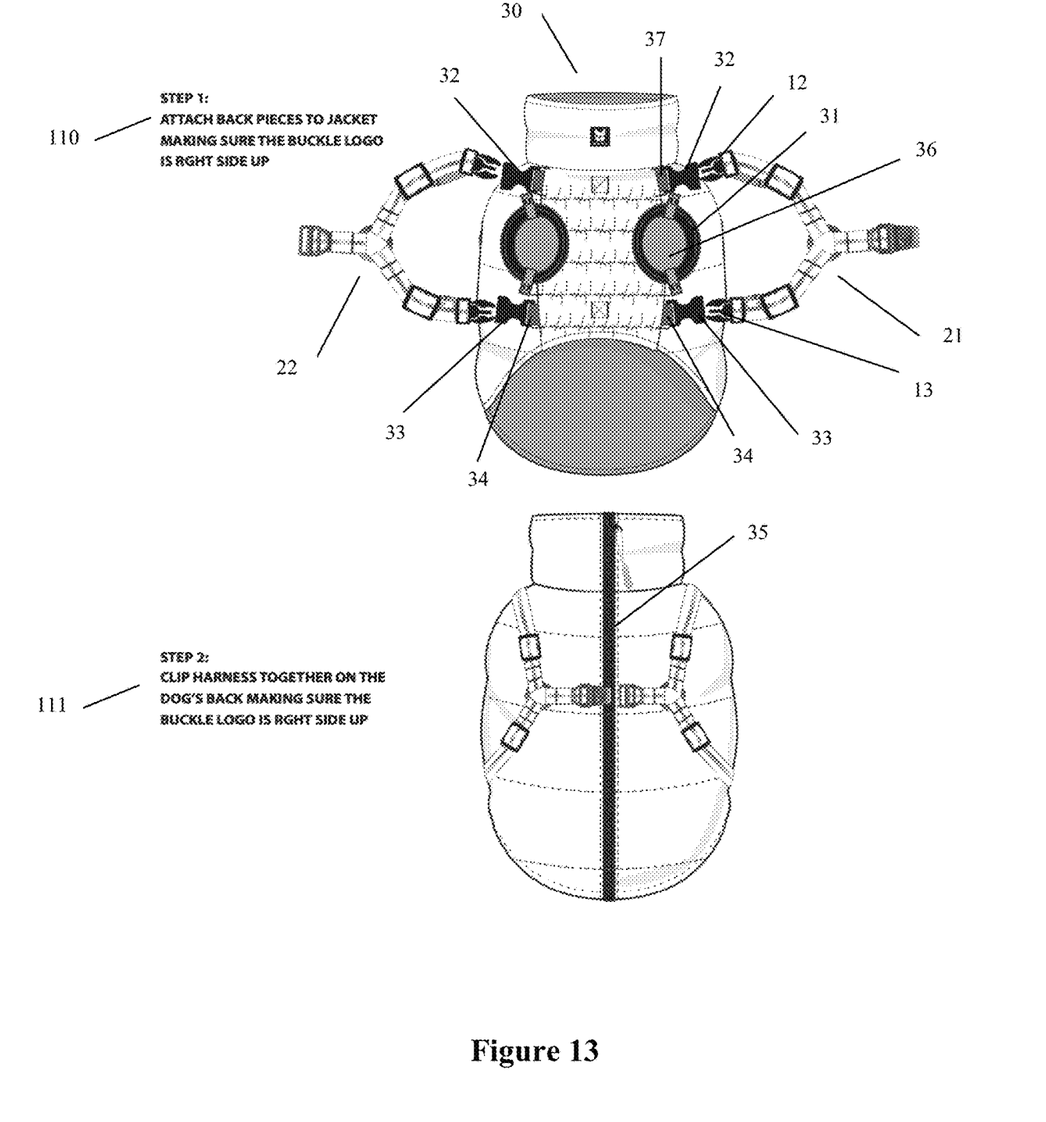
FIG. 13 is a visual guide for attaching a harness to an animal with specialized complimentary clothing.

FIG. 13 is a visual guide for attaching a harness to an animal with specialized complimentary clothing. In a preferred embodiment, the complimentary animal clothing 30 includes a body portion that covers a significant portion of the torso of the animal, apertures 36, which may simply be holes in the body portion, for allowing the coat to be pulled up onto the body over at least two of the animal's legs, leggings 31 that can cover at least part of the front legs of the animal, at least two front coat fasteners 32 and two rear coat fasteners 33, connected to the complimentary animal clothing 30 via front straps 37 and rear straps 34, and a self-attachment mechanism 35 such as a zipper that allows the coat to be wrapped around the animal. In step 110, a portion of a complementary harness, the upper portion formed by the first sub-portion 21 and second sub-portion 22 of the harness 1 described in FIGS. 8-11, may connect, via the upper front fasteners 12 and upper rear fasteners 13 on the first sub-portion 21 and second sub-portion 22 of the harness, to the front coat fasteners 32 and rear coat fasteners 33, respectively, of the complimentary animal clothing 30. In step 111, the connecting clip 14 of the first sub-portion 21 of the harness is connected to the clip connecting loop 20 of the second sub-portion 22 of the harness to wrap the harness around the back of the animal.

It should be understood that the word 'strap', whether in reference to the upper or lower straps of the harness or front or rear straps of the animal clothing, has a generic meaning. It is meant to denote any length of material capable of receiving force, such as but not limited to rope, fabrics, leather, chains, etc. In a preferred embodiment, the upper and lower straps of the harness, as well as the front and rear straps of the animal coat are durable and bendable material such as nylon.

It should also be noted that the front straps 37 and the rear straps 34 are but one embodiment of a reinforcement member. The reinforcement member may be any structure capable of distributing force received by the fasteners such that the fasteners are not merely pulling on the potentially fragile material that forms the animal coat. The animal coat requires a reinforcement member because the material of the coat, which is often chosen with aesthetic purposes in mind, may not be strong enough to withstand pulling forces from the integrated harness. In FIG. 13, the reinforcement member is formed by the front straps 37 and rear straps 34, which run along the underside of the animal coat and serve to distribute the pulling force received by the front coat fasteners 32 and rear coat fasteners over the underside of the animal. In another embodiment, the reinforcement member may be formed by reinforced fabric that is stitched into the coat material. This reinforced fabric may for example be connected to a web of fabric that distributes force throughout the animal coat, or may simply be an isolated island of reinforced fabric that will not tear when the fastener pulls on it and distributes force in a local area on the animal coat. In another embodiment, the coat fasteners may connect to reinforced fabric, and the coat may be further reinforced by straps that run along or across the coat that may give the coat material some strength or ability to resist pulling forces.

In some embodiments, the front straps 37 and rear straps 34 may run along the inside of the animal coat. This allows for the straps to be better secured to the complimentary animal clothing 30 without comprising the outer appearance of the complimentary animal clothing 30 or worrying about whether the coarse material of the strap destroys the outer material of the complimentary animal clothing 30.

In some embodiments, the fasteners, connected to the front straps 37 and rear straps 34, may connect to the complimentary animal clothing 30 independently. In other embodiments, the one front strap 37 may run along the ventral or dorsal side of the complimentary animal clothing 30 and be attached to the pair of front coat fasteners 32, and one rear strap 34 may run along the ventral or dorsal side of the complimentary animal clothing 30 and be attached to the pair of rear coat fasteners 33, allowing the underside or back of the animal to be supported and the force of pulling from the harness to be more evenly distributed.

In some embodiments, the fasteners may be placed in pairs along the compatible animal clothing 30. In some embodiments, a pair of front coat fasteners 32 may be placed anterior to the leggings 31, and a pair of rear coat fasteners 33 may be played posterior to the leggings 31.

In some embodiments, the front straps 37 and rear straps 34, which secure the fasteners to the body portion, may be covered by an additional layer of outer material of the body either to provide additional support to the front straps 37 and rear straps 34 or to hide them from view for aesthetic purposes.

In some embodiments, the compatible animal clothing may have pocket areas in the animal coat allowing the fasteners of the animal coat to be hidden within the coat when not connected to an upper portion of a harness, or for hiding the fasteners when connected to an upper portion of a harness such that only the harness upper straps and leash connecting loop are visible. This may increase the aesthetic value of the compatible animal clothing by hiding the fasteners which are functional, rather than aesthetic, parts of the animal clothing.

In some embodiments, the compatible animal clothing 30 may have additional features, such as elastic structures and elastic chords around the holes of the leggings and the portion of the body portion that wraps around the neck of the animal, allowing for adjustment of the coat to snugly fit the animal.

In some embodiments, the compatible animal clothing may have an attachment section on the inside of the body portion allowing the garment to connect to an additional section of the garment which may cover at least part of the lower back or the hind legs of the animal.

In some embodiments, the compatible animal clothing may have one or more pockets on the body portion, which may serve as storage for various objects during an outing with the animal.

In some embodiments, one or more of the pockets may have one or more thin holes, offering limited access to the contents of the pocket, so that the contents of the pocket may be dispensed conveniently, much like a tissue box dispenses tissues through a thin hole. This could be useful for example for doggy bags for dogs on walks.

The adjustable nature of the upper straps of the upper portion of the harness in some embodiments is extremely useful for owners who have multiple pieces of compatible animal clothing. For example, an owner may have multiple winter coats. Instead of needing to adjust each winter coat to fit the animal, the owner may simply adjust the upper portion of the harness once. By using the adjusted upper portion of the harness with different animal coats, an animal owner may save time in not needing to adjust each garment individually.

The adjustable nature of the upper straps of the upper portion of the harness may also be useful for an owner wishing to use the harness for more than one animal without buying a second harness. For example, if an owner has two differently-sized animals, the harness can be adjusted to fit either animal. For example, if an owner wishes to lend the harness to another owner with a differently-sized animal, the harness had be adjusted to fit the new animal.

The current disclosure may be useful for owners wishing to purchase stylish garments for their animals without compromising the safety of durability of the garments. The fact that the animal clothing and harness are complementary allows the owner flexibility in deciding whether to have their animal wear the garment or not without worrying about whether a harness will ruin the garment. For example, an animal winter jacket may benefit from a harness that runs along the inside of the jacket—a harness on the outside would pull on the insulating fabric, damaging it, displacing it or reducing its effectiveness.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. In combination, a coat for animals and a harness for animals:
   a. said animal harness comprising:
     i. an upper portion comprising:
       1. upper straps;
       2. a pair of upper front fasteners connected to said upper straps;
       3. a pair of upper rear fasteners connected to said upper straps;
       4. a leash connecting loop connected to said upper straps; and 5. wherein said upper straps are adjustable so that the animal harness can fit snugly on a given animal; and ii. a lower portion comprising
1. lower straps;
2. a pair of lower front fasteners connected to said lower straps that are complementary to the pair of front fasteners on the upper portion; and
3. a pair of lower rear fasteners connected to said lower straps that are complementary to the pair of rear fasteners on the upper portion; and b. said animal coat comprising:
i. a body portion for covering at least part of a torso of the animal;
ii. two or more apertures allowing the coat to be pulled up onto the body over at least two of the animal's legs;
iii. a pair of coat front fasteners, one on the right side of the body portion and one on the left side of the body portion, both positioned to be anterior to the animal's front legs, that are located on said body portion to correspond to locations of the lower front fasteners on said lower portion of said animal harness and complementary to one pair of front fasteners on the harness; and
iv. a pair of coat rear fasteners, one on the right side of the body portion and one on the left side of the body portion, both positioned to be posterior to the animal's front legs, that are located on said body portion to correspond to locations of the lower rear fasteners on said lower portion of said animal harness and complementary to one pair of rear fasteners on the harness;
v. said coat front fasteners and said coat rear fasteners being connected to a reinforcement member integrated into said body portion;

c. wherein the upper portion of the harness can connect to the bottom portion of the harness to form the animal harness;

d. wherein the upper portion of the harness can connect to the animal coat by the upper front fasteners connecting to the coat front fasteners and the upper rear fasteners connecting to the coat rear fasteners to form a harness integrated within the animal coat; and e. wherein, when connected to said lower portion of the harness or to said animal coat, the upper portion of the harness can be adjusted to fit a particular animal, created an adjusted upper portion, and said adjusted upper portion can retain its fit between multiple connections to said lower portion of the harness or said animal coat.

2. The combination of a coat for animals and a harness for animals of claim 1, further comprising one or more indicators on or connected to the upper, lower, front or rear straps of the animal harness or animal coat, displaying information about the type of harness or coat or identifying one or more fasteners, for facilitating assembly or use of the harness or animal coat with harness.

3. The combination of a coat for animals and a harness for animals of claim 2, wherein the reinforcement member of the animal coat comprises front and rear straps that run along the inside of the body portion so as not to crush or rub against the outside of the body portion and connect to front coat fasteners and rear coat fasteners, respectively, on the outside of the body portion via holes in the body portion.

4. The combination of a coat for animals and a harness for animals of claim 3, further comprising one or more pieces of the material forming the coat that are placed or sewn over the front and rear straps or front coat fasteners or rear coat fasteners of the animal coat to hide them from sight.

5. The combination of a coat for animals and a harness for animals of claim 4, further comprising pocket areas in the animal coat allowing the front coat fasteners or rear coat fasteners of the animal coat to be hidden within the coat when not connected to an upper portion of a harness, or for hiding the front coat fasteners or rear coat fasteners when connected to an upper portion of a harness such that only the harness straps and leash connecting loop are visible.

6. The coat for animals and harness for animals of claim 1, wherein said body portion is capable of covering a ventral, a side and a dorsal front region of an animal and comprises: a. a neck opening for a neck of the animal; b. two front leg apertures positioned to be on a ventral side of the body portion for a front legs of the animal; c. a rear opening for hindquarters of the animal; and d. a dorsal closure for closing the body portion over the body of the animal.

7. A coat for animals, comprising:
a. a body portion comprising a material for covering a front ventral region, front lateral regions and a front dorsal region of an animal, the body portion comprising:
i. a neck opening for a neck of the animal;
ii. two front leg apertures on a ventral side of the body portion for front legs of the animal;
iii. a rear opening for hindquarters of the animal; and
iv. a dorsal closure for closing the body portion over a body of the animal;
b. a reinforcement member connected to an inside of the body portion;
c. at least two fasteners connected to the reinforcement member, comprising:
i. at least one left fastener on the left side of the body portion; and
ii. at least one right fastener on the right side of the body portion; and
d. for each fastener, a hole in the body portion allowing the fastener to be presented on the outside of the body portion;
e. wherein said reinforcement member distributes force applied to the fasteners to a ventral portion of the animal with reduced compressing, rubbing or damaging the material of an outer layer of the body portion; and
f. wherein the fasteners are configured to connect with complementary fasteners outside of the body portion.

8. The coat for animals of claim 7, further comprising, at each aperture, a legging for covering the animal's leg.

9. The coat for animals of claim 7, wherein:
a. the at least one left fastener comprise:
i. a left front fastener; and
ii. a left rear fastener; and
b. the at least one right fastener comprise:
i. a right front fastener; and
ii. a right rear fastener.

10. The coat for animals of claim 9, wherein the left front fastener and right front fastener are positioned to be anterior to the front legs of the animal, and the left rear fastener and right rear fastener are positioned to be posterior to the front legs of the animal.

11. The coat for animals of claim 7, wherein the reinforcement member comprises a front strap and a rear strap, the front strap positioned to run along the ventral side of the animal coat anterior to the front legs of the animal and the rear strap positioned to run along the ventral side of the animal coat posterior to the front legs of the animal.

12. The coat for animals of claim 11, further comprising one or more pieces of the material that are placed or sewn over the front or rear straps to hide them from sight.

13. The coat for animals of claim 7, whereby the fasteners can be connected to a portion of a compatible harness with adjustable straps to form an adjustable harness integrated within the coat for animals.

14. The coat for animals of claim 7, wherein the reinforcement member is entirely covered by a layer of the body portion.

15. The coat for animals of claim 7, wherein the dorsal closure is a zipper.

16. The coat for animals of claim 7, wherein the fasteners are on a bottom side of the animal coat.

17. The coat for animals of claim 7, wherein the material of the body portion is not capable of sustaining pulling force from or directed to the animal without substantial risk of damage, and the reinforcement member is capable of sustaining pulling force from or directed to the animal without substantial risk of damage.

18. A coat for animals, comprising:
   a. a body portion for covering at least part of the torso of the animal;
   b. a pair of front coat fasteners, one on the right side of the body portion and one on the left side of the body portion;
   c. a pair of rear coat fasteners, one on the right side of the body portion and one on the left side of the body portion;
   d. a reinforcement member connected to and integrated within the body portion and connected to said front coat fasteners and to said rear coat fasteners at a fixed position on said body portion; and
   e. two or more apertures allowing the coat to be pulled up onto the body over at least two of the animal's legs;
   f: wherein the front coast fasteners are positioned to be anterior to the front legs of the animal, and the rear coat fasteners are positioned to be posterior to the front legs of the animal;
   g. whereby the front coat fasteners and rear coat fasteners of the coat for animals can be connected to a portion of a compatible harness with adjustable straps to form an adjustable harness integrated within the coat for animals; and
   h. wherein the reinforcement member of the animal coat comprises front and rear straps connected to and integrated within the body portion, and a front strap connects to both front coat fasteners in addition to connecting to the body portion, such that the front strap runs along the ventral or dorsal side of the animal, and a rear strap connects to both rear coat fasteners in addition to connecting to the body portion, such that the rear strap runs along the ventral or dorsal side of the animal, and the front and rear straps run along the inside of the body portion so as not to crush or rub against the outside of the body portion and connect to the front coat fasteners and rear coat fasteners, respectively, on the outside of the body portion via holes in the body portion.

* * * * *